(12) United States Patent
Takeuchi et al.

(10) Patent No.: US 7,822,520 B2
(45) Date of Patent: Oct. 26, 2010

(54) MOTOR-DRIVEN POWER STEERING APPARATUS

(75) Inventors: Yoshinori Takeuchi, Tochigi (JP); Shunya Senda, Tochigi (JP)

(73) Assignee: Showa Corporation, Saitama (JP)

( * ) Notice: Subject to any disclaimer, the term of this patent is extended or adjusted under 35 U.S.C. 154(b) by 894 days.

(21) Appl. No.: 11/716,367

(22) Filed: Mar. 9, 2007

(65) Prior Publication Data

US 2008/0073144 A1 Mar. 27, 2008

(30) Foreign Application Priority Data

Sep. 27, 2006 (JP) ............................. 2006-263494

(51) Int. Cl.
*B62D 6/00* (2006.01)
(52) U.S. Cl. ........................................................ 701/41
(58) Field of Classification Search ................... 701/41, 701/42, 43; 180/400, 443, 444, 446
See application file for complete search history.

(56) References Cited

U.S. PATENT DOCUMENTS 6,326,753 B1 * 12/2001 Someya et al. .............. 318/471

FOREIGN PATENT DOCUMENTS

| DE | 19943410 A1 | 5/2000 |
|---|---|---|
| EP | 1308368 A | 5/2003 |
| EP | 1452421 A | 9/2004 |
| JP | HEI 6-8839 | 1/1994 |

* cited by examiner

*Primary Examiner*—Kim T Nguyen
(74) *Attorney, Agent, or Firm*—Orum & Roth LLC

(57) ABSTRACT

In a motor-driven power steering apparatus, there are provided a reference output characteristic memory previously storing a reference output characteristic expressing a corresponding relation between a driving current of an electric motor and an output torque corresponding to the driving current, a correction coefficient computing circuit computing a ratio TO/TM between an output torque TM of the electric motor detected at a time of applying a predetermined current M to the electric motor, and an output torque TO corresponding to the driving current IM in the reference output characteristic as an output correction coefficient. A current control computing unit calculates a corrected current control signal by multiplying a current control signal of the electric motor computed on the basis of a steered condition of a vehicle by the output correction coefficient, and outputs a drive control signal based on the corrected current control signal to a motor driving unit.

3 Claims, 6 Drawing Sheets

MOTOR-DRIVEN POWER STEERING APPARATUS

BACKGROUND OF THE INVENTION

1. Field of the Invention

The present invention relates to a motor-driven power steering apparatus.

2. Description of the Related Art

In a motor-driven power steering apparatus, as described in Japanese Patent Application Laid-open No. 6-8839 (patent document 1), an electric motor is driven by a motor driving means, a rotation of the electric motor is converted into a linear stroke of a rack shaft by a power transmission mechanism, and a wheel coupled to the rack shaft is steered and assisted.

In the electric motor used in a motor-driven power steering apparatus, some dispersion is generated in particular motors on the basis of an individual difference of each of the motors, such as in an output characteristic serving as a relation between a driving current and an output torque corresponding to the driving current, even in the same standard product. Accordingly, even in the motor-driven power steering apparatus using the electric motor having the same standard (the same specification), an output of a rack shaft is dispersed or varied, and a steering assist characteristic is dispersed or varied.

Further, even in the motor-driven power steering apparatus of the same product class, the output of the rack shaft is dispersed or varied due to a dispersion or variation of a working precision or of an assembling precision of these constituting parts, or the like. As a result, the steering assist characteristic is dispersed or varied.

SUMMARY OF THE INVENTION

An object of the present invention is to correct a dispersion or variation of an output characteristic caused by an individual difference of an electric motor, make more uniform the output characteristic, and stabilize a steering assist characteristic, in a motor-driven power steering apparatus.

Another object of the present invention is to correct a dispersion or variation of a thrust characteristic caused by a working precision variation and a mounting precision variation of a constituting part, make more uniform a thrust of a rack shaft, and stabilize a steering assist characteristic, in the motor-driven power steering apparatus.

The present invention relates to a motor-driven power steering apparatus driving an electric motor by a motor driving means, converting a rotation of the electric motor into a linear stroke of a rack shaft by a power transmission mechanism, and steering and assisting a wheel coupled to the rack shaft. A reference output characteristic memory previously stores a reference output characteristic expressing a corresponding relation to be targeted between a driving current of the electric motor and an output torque corresponding to the driving current. A correction coefficient computing circuit calculates a ratio TO/TM between an output torque TM of the electric motor actually detected at a time of actually applying a predetermined driving current IM to the electric motor, and an output torque value TO corresponding to the driving current IM in the reference output characteristic as an output correction coefficient. A current control computing means calculates a corrected current control signal by multiplying the current control signal of the electric motor computed on the basis of a steered condition of a vehicle by the output correction coefficient, and outputs the drive control signal based on the corrected current control signal to the motor driving means.

Furthermore, the present invention relates to a motor-driven power steering apparatus driving an electric motor by a motor driving means, converting a rotation of the electric motor into a linear stroke of a rack shaft by a power transmission mechanism, and steering and assisting a wheel coupled to the rack shaft. A reference thrust characteristic memory previously stores a reference thrust characteristic expressing a corresponding relation to be targeted between a driving current of the electric motor and a thrust of the rack shaft corresponding to the driving current. A correction coefficient computing circuit calculates a ratio FO/FM between a thrust FM of the rack shaft actually detected at a time of actually applying a predetermined driving current IM to the electric motor, and a thrust value FO corresponding to the driving current IM in the reference thrust characteristic as a thrust correction coefficient. A current control computing means calculates a corrected current control signal by multiplying the current control signal of the electric motor computed on the basis of a steered condition of a vehicle by the output correction coefficient, and outputs the drive control signal based on the corrected current control signal to the motor driving means.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS (Embodiment 1) (FIGS. 1 to 4)

Figure 1:
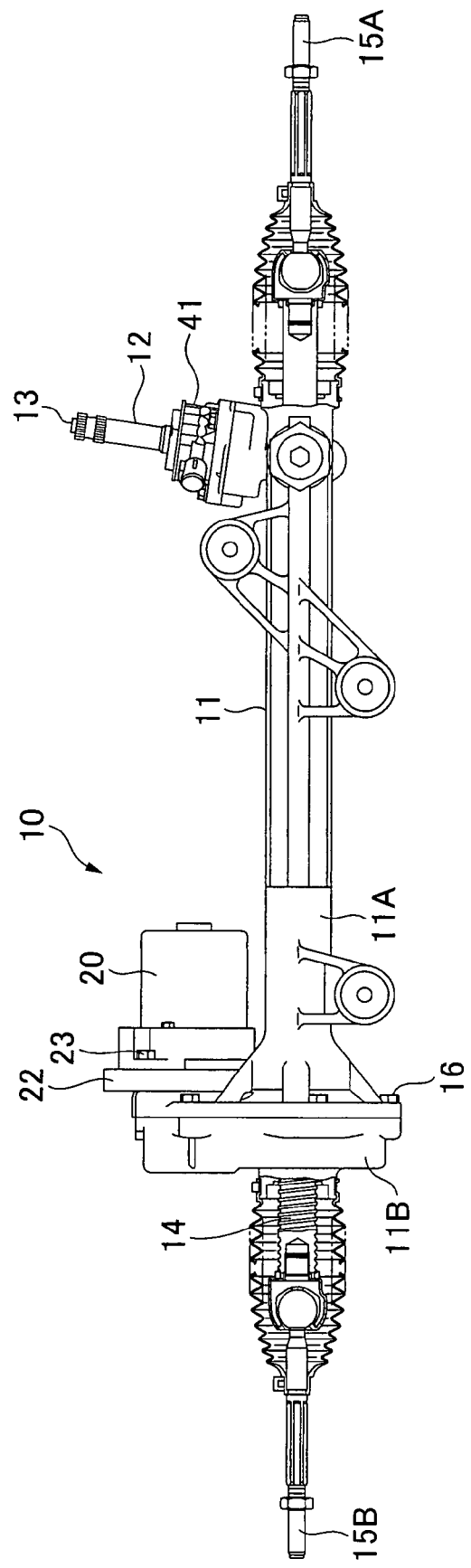
FIG. 1 is a front elevational view showing a motor-driven power steering apparatus.

A motor-driven power steering apparatus 10 structure is shown in FIG. 1. A first gear housing 11A and a second gear housing 11B are provided by dividing a gear housing 11. An input shaft 12 such as a steering shaft to which a steering wheel is coupled is supported to the gear housing 11 such as the first gear housing 11A. An output shaft (not shown) is coupled to the input shaft 12 via a torsion bar 13 (not shown). A pinion (not shown) is provided in the output shaft. A rack shaft 14 engaging with the pinion is supported to the gear housing 11 so as to be movable linearly in a lateral direction. A steering torque sensor 41 is provided between the input shaft 12 and the output shaft. The steering torque sensor 41 detects a steering torque on the basis of a relative rotational displacement amount generated between the input shaft 12 and the output shaft due to an elastic torsional deformation of a torsion bar caused by steering torque of a manual steering input applied to a steering wheel, and outputs a steering torque signal Ts.

The motor-driven power steering apparatus 10 is structured such that both end portions of the rack shaft 14 are protruded to both sides of the gear housing 11 such as the first gear housing 11A and the second gear housing 11B, and tie rods 15A and 15B are coupled to end portions thereof. Left and right wheels can be steered via the tie rods 15A and 15B working with a linear movement of the rack shaft 14.

Figure 2:
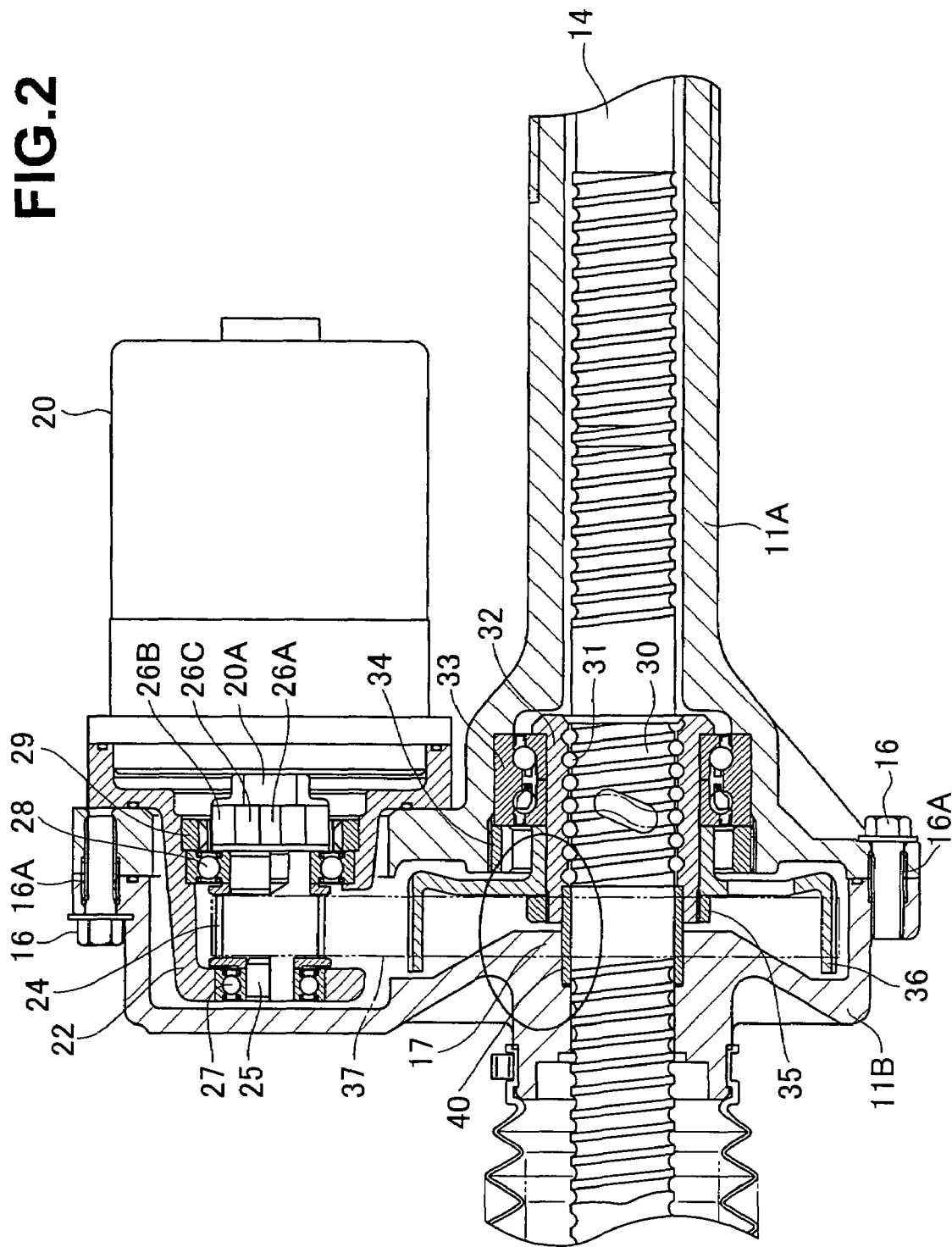
FIG. 2 is a cross sectional view showing a main portion of the motor-driven power steering apparatus.

The motor-driven power steering apparatus 10 is structured, as shown in FIG. 2, such that an electric motor 20 is fixed to a holder 22 by a mounting bolt 21 (not shown). The holder 22 can be attached to and detached from the first gear housing 11A by a mounting bolt 23. The holder 22 attached to the first gear housing 11A and inserted to an inner portion of the first gear housing 11A has a fixed gap with respect to inner peripheries of the gear housings 11A and 11B. Oscillation of the holder 22 is allowed with respect to the first gear housing 11A. It is possible to adjust tension of a belt 37 wound around a drive pulley 24 and a driven pulley 36 which are supported to the holder 22 in a manner mentioned below.

The holder 22 supports a center axis 25 of the drive pulley 24, and engages and attaches a joint 26A in an axial end of a rotating shaft 20A of the electric motor 20 and a joint 26B in an axial end of the center axis 25 with each other from an axial direction. An intermediate joint 26C such as a rubber buffer or the like is pinched between teeth provided at a plurality of positions in a peripheral direction. The drive pulley 24 is supported at both end portions of the center axis 25 to the holder 22 by bearings 27 and 28. Reference numeral 29 denotes a stop ring for fixing an outer ring of the bearing 28.

The motor-driven power steering apparatus 10 is structured such that a ball screw 30 is provided in the rack shaft 14. A ball nut 32 engaging with the ball screw 30 via a ball 31 is provided. The ball nut 32 is rotatably supported by a bearing 33 supported to the gear housing 11 such as the first gear housing 11A. Reference numeral 34 denotes a nut for fixing an outer ring of the bearing 33. The driven pulley 36 is fixed to an outer periphery of the ball nut 32 by a lock nut 35.

The motor-driven power steering apparatus 10 is structured such that the belt 37 is wound around the drive pulley 24 in a side of the electric motor 20, and the driven pulley 36 in a side of the ball nut 32. The rotation of the electric motor 20 is transmitted to the ball nut 32 via the drive pulley 24, and the belt 37 and the driven pulley 36, and is converted into a linear stroke of the rack shaft 14 by extension, thereby linearly moving the rack shaft 14. Accordingly, the electric motor 20 applies a steering assist force to a steering system.

The motor-driven power steering apparatus 10 is structured such that the rack shaft 14 supported to the first gear housing 11A is passed through the second gear housing 11B. The holder 22 attached to the first gear housing 11A is covered by the second gear housing 11B. The first gear housing 11A and the second gear housing 11B are fastened by a plurality of fastening bolts 16. The first gear housing 11A and the second gear housing 11B are positioned by striking both end portions of a plurality of tubular knock pins 16A and are thereafter engaged and fastened by the fastening bolts 16 inserted to the respective knock pins 16A, as shown in FIG. 2. A part of the fastening bolts 16 is engaged with the first gear housing 11A through the knock pin 16A, and the other fastening bolts 16 are fastened to the second gear housing 11B through the knock pin 16A.

The motor-driven power steering apparatus 10 is provided with the following structure for making an oscillation of the rack shaft 14 supported to the gear housings 11A and 11B small.

In the second gear housing 11B, a portion facing to the ball nut 32 supported to the first gear housing 11A is set to a bush support portion 17, and a bush 40 is bridged between the ball nut 32 and the bush support portion 17. The bush 40 is pressed into a leading end side inner peripheral portion of the ball nut 32 so as to be fixedly provided. The rack shaft 14 is supported in a linearly slidable manner to an inner peripheral portion of the bush support portion 17 so as to be rotationally slidable.

The bush 40 sets a part in an axial direction of an outer periphery of a tube body made of a metal or the like to be a slidable portion with the bush support portion 17, and sets an entire portion of an inner periphery to be a slidable portion with the rack shaft 14. The slidable portion is obtained by forming a lubricating coating layer made of an oil-contained polyacetal, a tetrafluoroethylene or the like on a surface of the tube body in accordance with a coating or the like.

Figure 3:
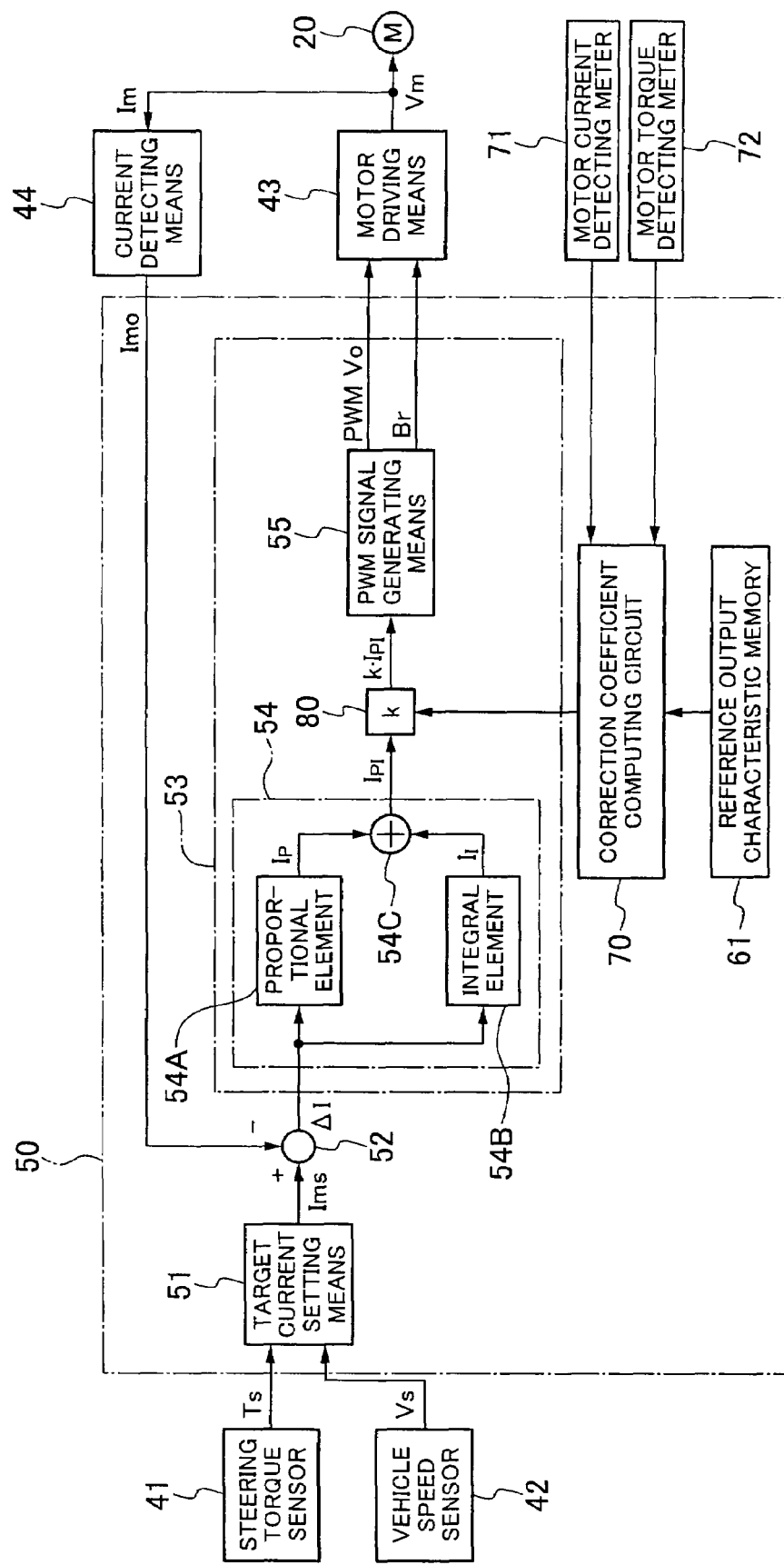
FIG. 3 is a block diagram showing a control system of an embodiment 1 of the motor-driven power steering apparatus.

The motor-driven power steering apparatus 10 has the following controller 50 for the electric motor 20 (FIG. 3).

A controller 50 is accessorily provided with a steering torque sensor 41 and a vehicle speed sensor 42. The steering torque sensor 41 detects the steering torque of the steering system and outputs the steering torque signal Ts to the controller 50 as mentioned above. The vehicle speed sensor 42 detects a vehicle speed and outputs a vehicle speed signal Vs to the controller 50.

The controller 50 has various arithmetic processing means, signal generating means, memories or the like through the utilization of a microprocessor. The controller 50 generates a drive control signal $V_0$ (PWM signal) to which a proportional control (P) and an integral control (I) are applied, thereby driving and controlling the motor driving means 43.

The motor driving means 43 is structured by a bridge circuit constituted by four switching elements, for example, four power field effect transistors (FET), insulated gate bipolar transistors (IGBT) or the like, outputs a motor voltage Vm on the basis of the drive control signal $V_0$, and drives the electric motor 20. When the steering wheel is steered in a clockwise direction, the steering assist force is applied to the steering system in such a manner that the front wheels are turned in a clockwise direction, for example, by positively rotating the electric motor 20.

The controller 50 is accessorily provided with a current detecting means 44. The current detecting means 44 detects a motor current Im actually flowing through the electric motor 20, and feeds back a detected current signal Imo converted into a digital signal corresponding to the motor current Im to the controller 50 (negative feedback).

The controller 50 has a target current setting means 51, a deviation computing means 52 and a current control computing means 53.

The target current setting means 51 is provided with a memory such as a read only memory (ROM) or the like. The target current setting means 51 reads an assist current signal Ima with respect to a steering torque signal Ts having the vehicle speed signal Vs as a parameter from the steering torque signal Ts output by the steering torque sensor 41, and a target current signal Ims map previously stored in the memory on the basis of the steering torque signal Ts and the vehicle speed signal Vs output by the vehicle speed sensor 42. The target current setting means 51 outputs the assist current signal Ima as the target current signal Ims to the deviation computing means 52.

The deviation computing means 52 computes a deviation (Ims-Imo) between the target current signal Ims and the detected current signal Imo, and outputs a deviation signal ΔI to the current control computing means 53.

The current control computing means 53 gives a direction such as a rotational direction of the electric motor 20, polarity signal Br and a PWM signal $V_0$ corresponding to a duty ratio to the motor driving means 43 of the electric motor 20 in correspondence to the deviation signal Δl between the target current signal Ims and the detected current signal Imo.

The current control computing means 53 is constituted by a proportional integral (PI) control means 54, and a PWM signal generating means 55.

The PI control means 54 is provided with a proportional element 54A generating a proportional sensitivity KP so as to execute a proportional control, an integral element 54B generating an integral gain KI so as to execute an integral control, and an adder adding output signals of the proportional element 54A and the integral element 54B. The proportional element 54A and the integral element 54B are connected in parallel. The proportional element 54A and the integral element 54B respectively output a proportional signal IP obtained by multiplying the deviation signal ΔI by the proportional sensitivity KP and an integral signal II obtained by applying an integral process having an integral gain KI to the deviation signal ΔI to the adder 54C. The adder 54C adds the proportional signal IP and the integral signal II, and outputs the proportional integral signal IPI (IP+II) toward the PWM signal generating means 55.

The PWM signal generating means 55 outputs a direction polarity signal Br corresponding to a direction and a magnitude of the proportional integral signal IPI and a PWM signal corresponding to the duty ratio as a drive control signal $V_0$ toward the motor driving means 43. The motor driving means 43 drives the electric motor 20 on the basis of a motor drive voltage Vm.

Accordingly, the controller 50 executes the following assist control with respect to the electric motor 20 of the motor-driven power steering apparatus 10.

(1) When the steering torque detected by the steering torque sensor 41 is lower than a predetermined value, the steering assist force is not necessary, and the electric motor 20 is not driven.

(2) When the steering torque detected by the steering torque sensor 41 is more than the predetermined value, a steering assist force is necessary. Accordingly, the electric motor 20 is driven so as to be normally rotated, and assist control is executed. The rotating force of the electric motor 20 is transmitted to the ball nut 32 via the drive pulley 24, the belt 37 and the driven pulley 36, and is formed as a steering assist force linearly stroking the rack shaft 14 via the ball screw 30.

Accordingly, the motor-driven power steering apparatus 10 in accordance with the embodiment 1 is provided with the following structure, for correcting dispersion or variation of an output characteristic caused by an individual difference of the electric motor 20 in order to stabilize a steering assist performance.

Figure 4:
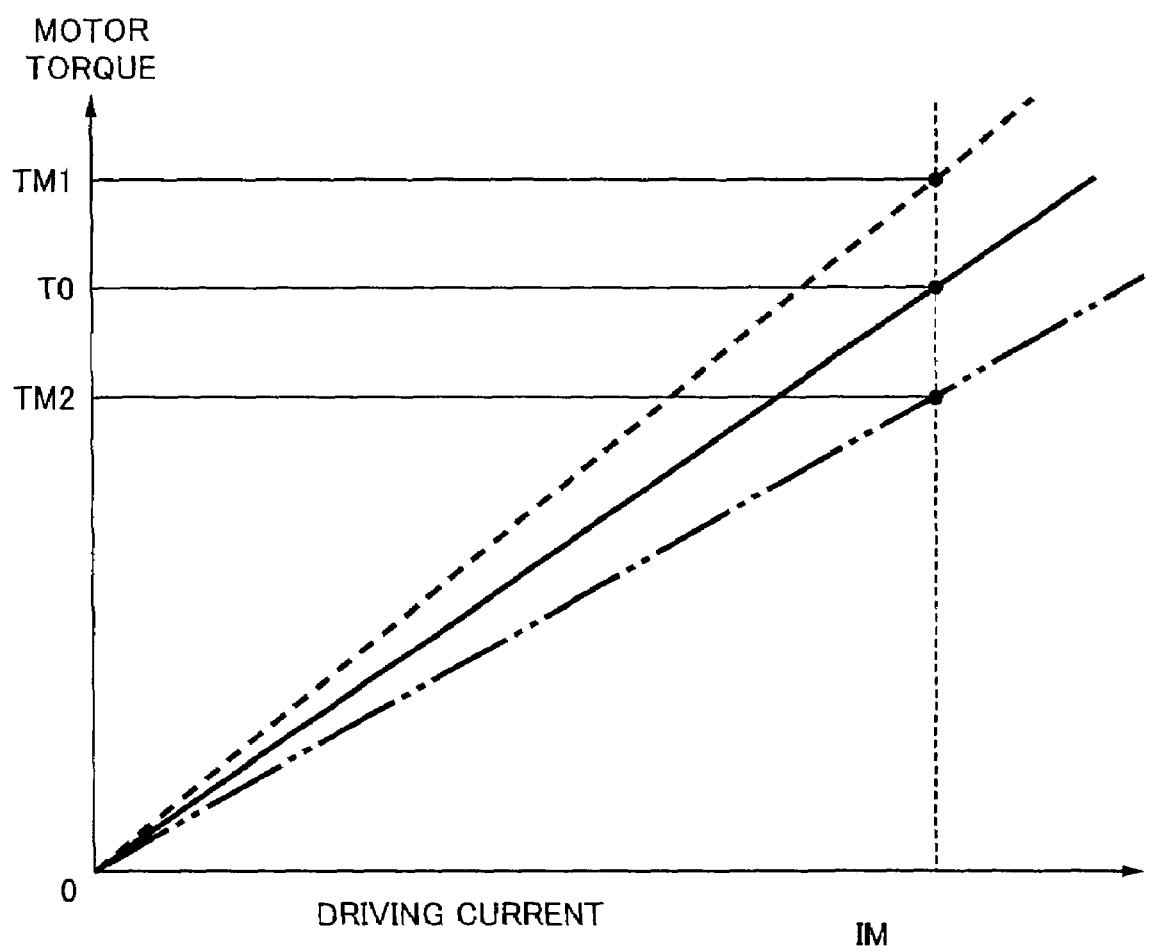
FIG. 4 is a graph showing an output characteristic of an electric motor.

The controller 50 has a reference output characteristic memory 61 (an X-Y map) which stores a reference output characteristic expressing a relation to be targeted between a driving current IM of the electric motor 20 and an output torque value TO corresponding to the driving current IM, for example, shown by a solid line in FIG. 4. The reference output characteristic measures an output torque value TMx of the motor when feeding a prescribed driving current IM, for example, with regard to each of a plurality of electric motors 20 having the same standard product, and an average value of a plurality of values TMx is set to TO. The driving current IM and the output torque value TO generally approximate a linear relation shown in FIG. 4. This may approximate a nonlinear relation.

The controller 50 has a correction coefficient computing circuit 70 calculating a ratio TO/TM between an output torque TM value (TM1, TM2 or the like) of the electric motor 20 detected at a time of applying a predetermine driving current IM to the electric motor 20 employed in the current motor-driven power steering apparatus 10, and an output torque value TO corresponding to the driving current value IM and obtained by comparing with a reference output characteristic stored in the reference output characteristic memory 61 as an output correction coefficient k. The driving current IM applied to the electric motor 20, and the output torque TM detected at this time are respectively detected by a motor current detecting meter 71 and a motor torque detecting meter 72 provided outside the controller 50, and are input to the correction coefficient computing circuit 70. In this case, the structure may be made such that the driving current IM and the torque TM are actually measured as an individual simple substance performance of the motor so as to be stored in the motor itself, before assembling the electric motor 20 in the gear housing 11. The motor may be connected to the controller 50 at a time of being assembled so as to be read in the correction coefficient computing circuit 70.

The controller 50 has a multiplication means 80 calculating a corrected current control signal k·IPI by multiplying the current control signal of the electric motor 20 computed on the basis of a steered condition (a steering torque signal Ts and a vehicle speed signal Vs) of the vehicle. A proportional integral signal IPI may be computed by a target current setting means 51, a deviation computing means 52 and a PI control means 54 of a current control computing means 53 in the present embodiment by the output correction coefficient k computed by the correction coefficient computing circuit 70. The PWM signal generating means 55 of the current control computing means 53 outputs a direction polarity signal Br corresponding to a direction and a magnitude of the correction current control signal k·IPI and a PWM signal corresponding to a duty ratio as a driving control signal $V_0$ based on the correction current control signal k·IPI toward the motor driving means 43. The motor driving means 43 drives the electric motor 20 by a motor drive voltage Vm.

In accordance with the present embodiment, the following operation and effect can be obtained.

The structure is made such as to have the reference output characteristic memory 61 which stores the reference output characteristic expressing the relation to be targeted between the driving current value of the electric motor 20 and the output torque value corresponding to the driving current value, and the correction coefficient computing circuit 70 calculating the ratio TO/TM between the output torque value TM of the electric motor 20 detected when actually applying the predetermine driving current IM to the electric motor 20, and the output torque value TO corresponding to the driving current IM on the basis of the reference output characteristic as the output correction coefficient k. The current control computing means 53 calculates the corrected current control signal by multiplying the current control signal of the electric motor 20 computed on the basis of the steered condition of the vehicle by the output correction coefficient k, and outputs the drive control signal based on the corrected current control signal to the motor driving means 43. Accordingly, it is possible to correct the dispersion and variation of the output characteristic caused by the individual difference of the electric motor 20. The output characteristic is corrected such as to come to the reference output characteristic, so that it is possible to stabilize the steering assist performance.

Figure 5:
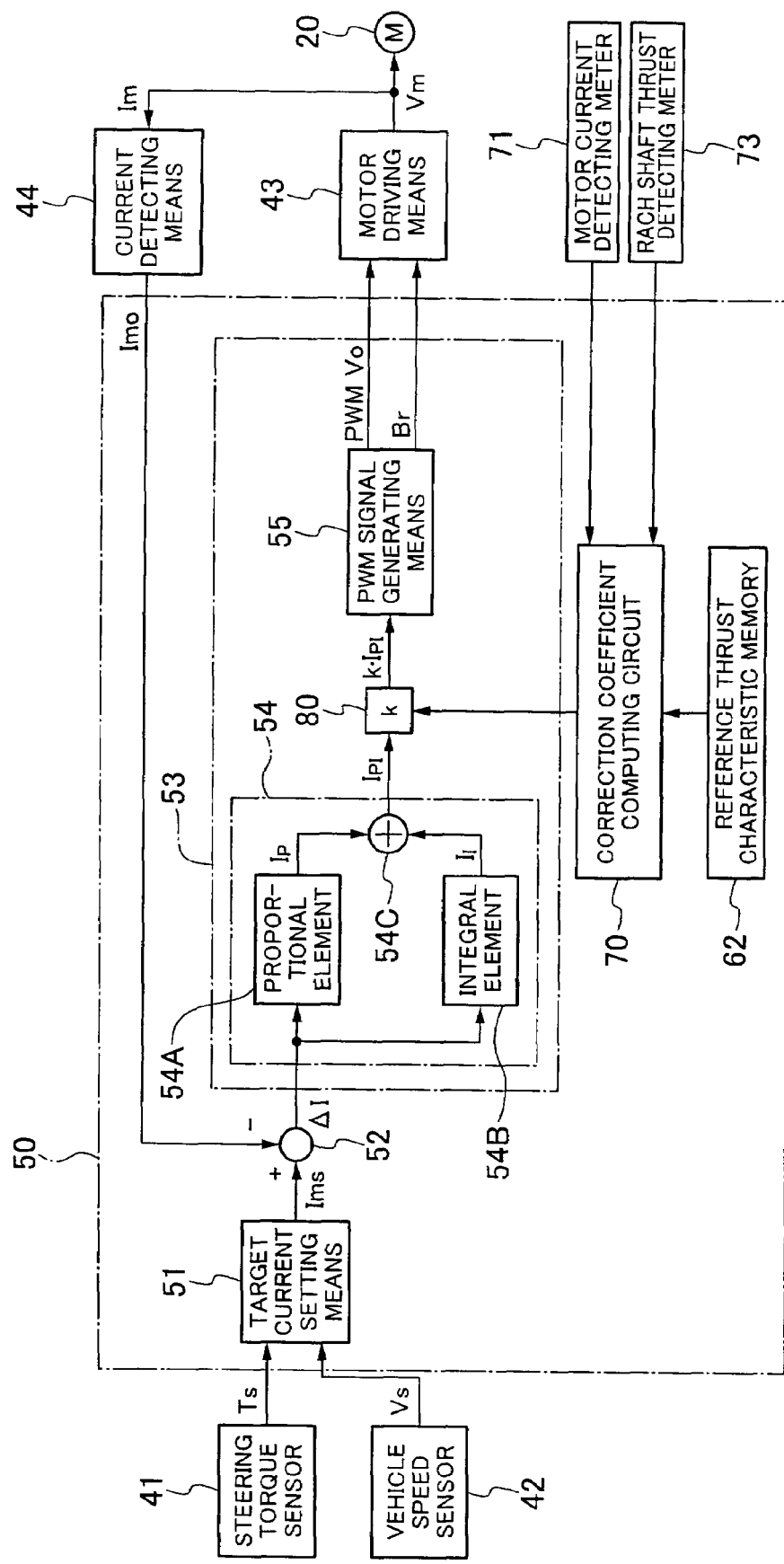
FIG. 5 is a block diagram showing a control system of an embodiment 2 of the motor-driven power steering apparatus.
Figure 6:
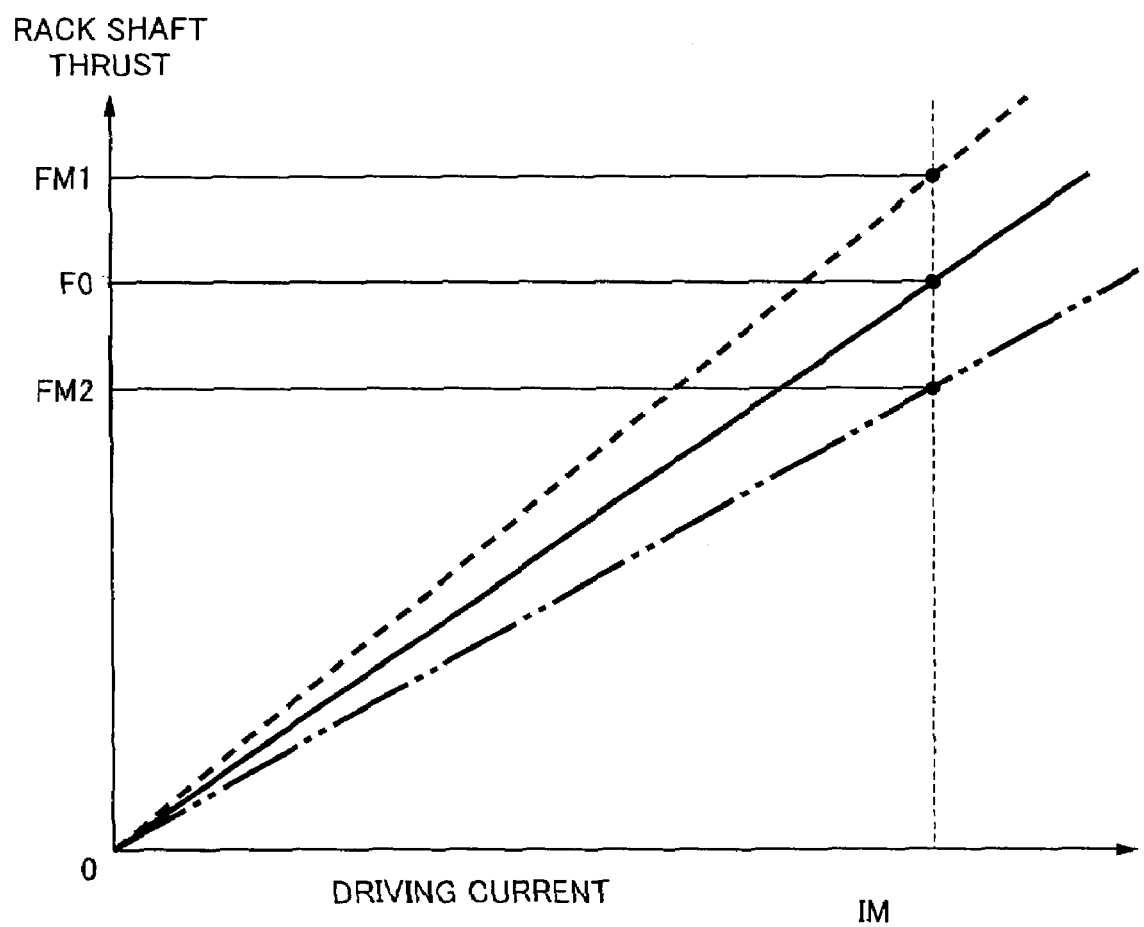
FIG. 6 is a graph showing a thrust characteristic of the motor-driven power steering apparatus.

(Embodiment 2) (FIGS. 5 and 6)

A motor-driven power steering apparatus 10 in accordance with an embodiment 2 is different from the motor-driven power steering apparatus 10 in accordance with the embodiment 1 in that stabilization of steering assist performance is achieved by correcting a dispersion or variation of a thrust characteristic of the rack shaft 14 caused by a working precision variation or an assembling precision variation of the constituting parts of the motor-driven power steering apparatus 10 including the electric motor. This structure becomes effective in the case that an independent output characteristic of the electric motor 20 can not be detected after the electric motor 20 is fixed to the holder 22 of the motor-driven power steering apparatus 10 or assembled in the gear housing.

The controller 50 has a reference thrust characteristic memory 62 which stores a reference thrust characteristic expressing a relation to be targeted between the driving current IM of the electric motor 20, and a thrust FO of the rack shaft 14 corresponding to the driving current IM, for example, shown by a solid line in FIG. 6. The reference thrust characteristic is obtained by measuring a rack shaft thrust FMx of the motor-driven power steering apparatus 10 when feeding a certain driving current IM to the electric motor 20 installed in the motor-driven power steering apparatus 10, for example, in each of a plurality of motor-driven power steering apparatuses 10 of the same product class, and setting an average value of a plurality of values FMx to FO. The driving current IM and the thrust FO approximate a linear relation shown in FIG. 6.

The controller 50 has a correction coefficient computing circuit 70 calculating a ratio FO/FM between a thrust FM (FM1, FM2 or the like) of the rack shaft of the motor-driven power steering apparatus 10 detected when applying a predetermine driving current IM to the electric motor 20 of the current motor-driven power steering apparatus 10, and a thrust FO corresponding to the driving current IM on the basis of a rack reference thrust characteristic stored in the reference thrust characteristic memory 62 as a thrust correction coefficient k. The driving current IM applied to the electric motor 20, and the thrust FM detected at this time are respectively detected by the motor current detecting meter 71 and a thrust detecting meter 73 provided outside the controller 50, and are input to the correction coefficient computing circuit 70.

The controller 50 has a multiplication means 80 calculating the current control signal of the electric motor 20 computed on the basis of a steered condition such as a steering torque signal Ts and a vehicle speed signal Vs of the vehicle, calculating a corrected current control signal k·IPI by a proportional integral signal IPI computed by a target current setting means 51, and a deviation computing means 52 and a PI control means 54 of a current control computing means 53 in the present embodiment by the thrust correction coefficient k computed by the correction coefficient computing circuit 70 in the present embodiment. The PWM signal generating means 55 of the current control computing means 53 outputs a direction polarity signal Br corresponding to a direction and a magnitude of the correction current control signal k·IPI and a PWM signal corresponding to a duty ratio as a driving control signal $V_0$ based on the correction current control signal k·IPI toward the motor driving means 43. The motor driving means 43 drives the electric motor 20 by a motor drive voltage Vm.

In accordance with the present embodiment, the following operation and effect can be obtained.

The structure is made such as to have the reference thrust characteristic memory 62 previously storing the reference thrust characteristic expressing the corresponding relation to be targeted between the driving current value of the electric motor 20 and the thrust of the rack shaft 14 corresponding to the driving current, and the correction coefficient computing circuit 70 calculating the ratio FO/FM between the thrust FM of rack shaft 14 actually detected by applying the predetermine driving current IM to the electric motor 20, and the thrust FO corresponding to the driving current IM on the basis of the reference thrust characteristic map as the thrust correction coefficient k. The current control computing means 53 calculates the corrected current control signal by multiplying the current control signal of the electric motor 20 computed on the basis of the steered condition of the vehicle by the output correction coefficient, and outputs the drive control signal based on the corrected current control signal to the motor driving means 43. Accordingly, it is possible to correct the dispersion or variation of the thrust characteristic caused by the working precision variation or the assembling precision variation of the constituting parts of the transmission system up to the rack shaft including the electric motor. The thrust characteristic is corrected such as to come to the reference thrust characteristic, and it is possible to stabilize the steering assist performance.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus driving an electric motor by a motor driving means, converting a rotation of the electric motor into a linear stroke of a rack shaft by a power transmission mechanism, and steering and assisting a wheel coupled to the rack shaft, comprising:

a reference output characteristic memory which stores a reference output characteristic expressing a corresponding relation to be targeted between a driving current of the electric motor and an output torque corresponding to the driving current;

a correction coefficient computing circuit which calculates a ratio TO/TM between an output torque TM of the electric motor actually detected at a time of actually applying a predetermined driving current IM to the electric motor, and an output torque value TO corresponding to the driving current IM in the reference output characteristic as an output correction coefficient; and a current control computing means which calculates a corrected current control signal by multiplying the current control signal of the electric motor computed on the basis of a steered condition of a vehicle by the output correction coefficient, and outputs the drive control signal based on the corrected current control signal to the motor driving means.

2. A motor-driven power steering apparatus as claimed in claim 1, wherein the reference output characteristic stored by the reference output characteristic memory is obtained by measuring an output torque value TMx of the electric motor when feeding a prescribed driving current IM in each of a plurality of electric motors having the same standard product, and setting an average value of a plurality of output torque values TMx to the output torque value TO.

3. A motor-driven power steering apparatus as claimed in claim 2, wherein the driving current IM and the output torque TM detected when applying the driving current IM are detected respectively by a motor current detecting meter and a motor torque detecting meter, and are input to the correction coefficient computing circuit.

* * * * *